US009479990B1

(12) United States Patent
Chen et al.

(10) Patent No.: US 9,479,990 B1
(45) Date of Patent: Oct. 25, 2016

(54) ROAMING MANAGEMENT FOR CLIENT DEVICES

(71) Applicant: Western Digital Technologies, Inc., Irvine, CA (US)

(72) Inventors: Paul Chen, Huntington Beach, CA (US); Martin Proepper, Corona, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 94 days.

(21) Appl. No.: 13/902,748

(22) Filed: May 24, 2013

Related U.S. Application Data

(60) Provisional application No. 61/814,112, filed on Apr. 19, 2013.

(51) Int. Cl.
*H04W 36/30* (2009.01)

(52) U.S. Cl.
CPC .................................. *H04W 36/30* (2013.01)

(58) Field of Classification Search
None
See application file for complete search history.

(56) References Cited

U.S. PATENT DOCUMENTS

| | | | | |
|---|---|---|---|---|
| 2006/0002355 A1* | 1/2006 | Baek | ...................... | H04W 36/14 370/338 |
| 2007/0232307 A1* | 10/2007 | Ibrahim | ................ | H04W 36/30 455/436 |
| 2008/0242305 A1* | 10/2008 | Kahlert | ................. | H04W 36/32 455/440 |
| 2009/0286534 A1* | 11/2009 | Garg | ...................... | H04W 36/10 455/432.1 |
| 2010/0113034 A1* | 5/2010 | Ricci | ...................... | H04M 1/642 455/440 |
| 2010/0165910 A1* | 7/2010 | Mathews | ........... | H04B 7/15528 370/315 |
| 2011/0194442 A1* | 8/2011 | Narasimhan | ...... | H04W 36/0083 370/252 |
| 2013/0012260 A1 | 1/2013 | Salkintzis et al. | | |
| 2013/0148641 A1* | 6/2013 | Sivaprakasam | ....... | H04W 36/30 370/338 |
| 2013/0259005 A1* | 10/2013 | Kulkarni | ............... | H04W 36/30 370/332 |
| 2014/0247708 A1* | 9/2014 | Knox | .................... | H04W 28/08 370/216 |

* cited by examiner

*Primary Examiner* — Charles C Jiang
*Assistant Examiner* — George Atkins, Jr.
(74) *Attorney, Agent, or Firm* — Young Law Firm, P.C.

(57) ABSTRACT

Embodiments of a wireless roaming management system are disclosed, wherein the system is configured to manage roaming of a client device across access points. The system includes processor(s) and memory for storing signal strength data for access points operating on a local area network. In one embodiment, the system is configured to transfer a client device from one access point to another. For example, in response to receiving, from a source access point, a request for a roaming calculation for a client device connected to the source access point, the system can determine a target access point to transfer the client device based on the stored signal strength data and the roaming calculation. The system can then cause the client device to be disconnected from the source access point and connected to the target access point.

10 Claims, 7 Drawing Sheets

ROAMING MANAGEMENT FOR CLIENT DEVICES

CROSS-REFERENCE TO RELATED APPLICATIONS

This application claims priority to U.S. Provisional Application No. 61/814,112, entitled "ROAMING MANAGEMENT FOR CLIENT DEVICES," filed Apr. 19, 2013, which is herein incorporated by reference in its entirety.

BACKGROUND

Many local area networks (LANs), such as found in homes or businesses, include multiple wireless access points and/or range extenders (collectively referred to as "access points" herein for convenience) in order to increase wireless coverage over an area. Thus, a client device operating on the LAN may connect to multiple access points as a user moves around the area. For example, the user may connect to a first access point in the bedroom and a second access point in the living room. During the course of a day, the user may move and switch access points multiple times.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As users move across different access points, the resulting connections from user devices to respective access points may not be optimal. For example, client devices may be configured to retain a connection to a first access point, even if the client device has moved to a location where a second access point now has a stronger signal. Thus, the client device may not have the best wireless signal available, which can result in slow downs, broken connections, errors and other issues with the client device's wireless connection. Thus, providing a system that is able to transparently, to the client device, handoff the client device from one access point to another can be beneficial.

Embodiments of a roaming management (RM) system are disclosed, wherein the system is configured to determine relative signal strengths of access points, select the access point deemed capable of providing the strongest signal to the client device, and force the client device to connect to the selected access point.

In one embodiment, a roaming manager comprises one or more processors and memory for storing signal strength data. The roaming manager is configured to identify a roaming determination trigger and, if a roaming determination is triggered, determine a target access point to service a client device based on signal strength data. The roaming manager then causes the client device to be disconnected from a current access point and connect to the target access point.

Various aspects of the RM system will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Figure 1:
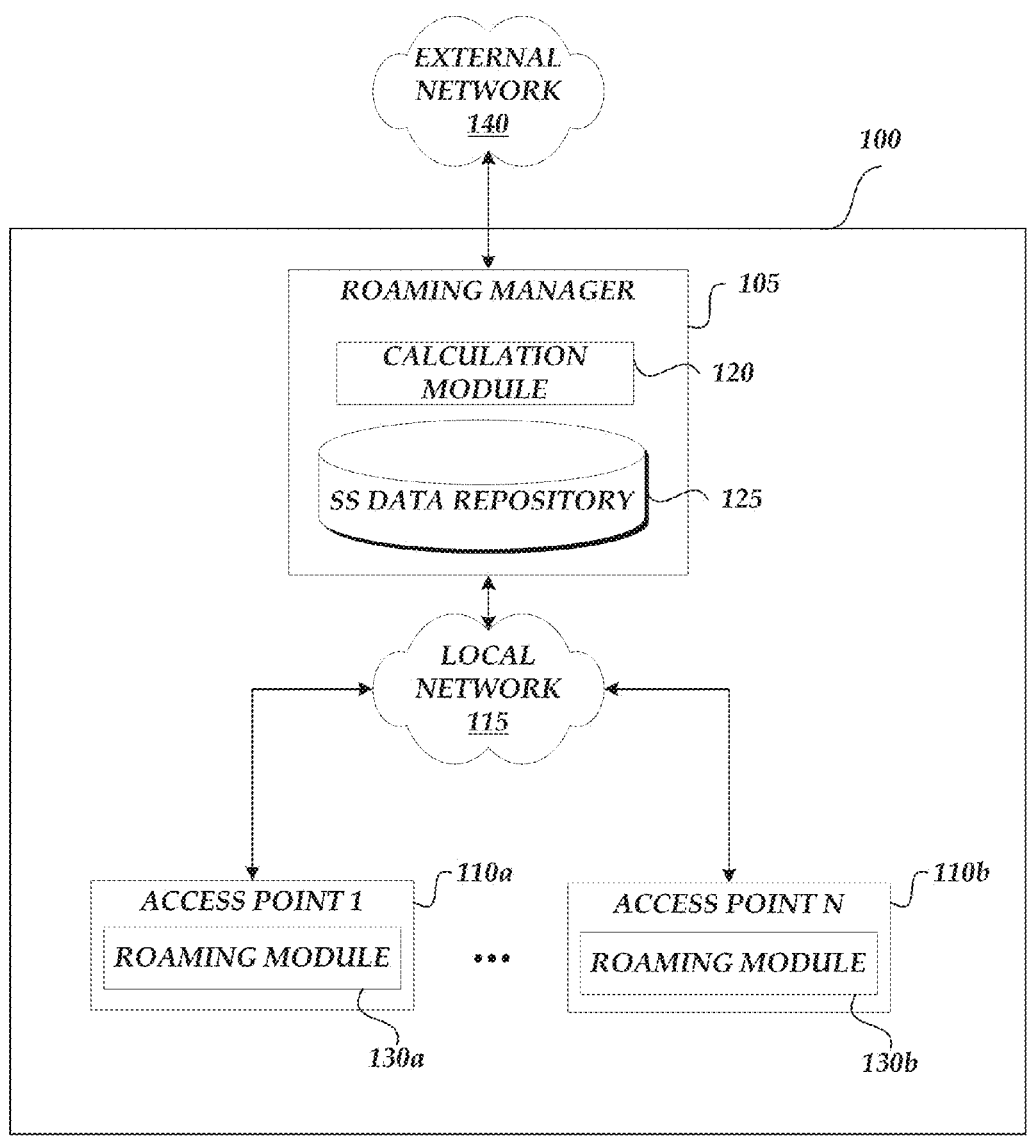
FIG. 1 illustrates a block diagram of an embodiment of a roaming management (RM) system that provides for client roaming between access points.

FIG. 1 illustrates a block diagram of an embodiment of a roaming management system that provides for client roaming between access points. In the embodiment of FIG. 1, the RM system 100 includes a roaming manager 105, which may be operating on a networking device (e.g., a router, gateway, switch, modem, access point, range-extender, etc.) or server, and a plurality of access points 110a, 110b (also referred to as access point 110) or other wireless network access devices connected via a local network 115 (e.g., a LAN). There may be any number of access points depending on the desired coverage area for the local network 115. In some cases, access points may be multi-functional (e.g., a router/AP, AP/range-extender, etc.). In one embodiment, each access point is configured to broadcast the same service set identification (SSID), though other embodiments may use multiple SSIDs. The connections may be wired or wireless (e.g., 802.11a/b/g/n/ac). In one embodiment, the roaming manager 105 includes a calculation module 120 for determining relative signal strengths and a signal strength data repository 125 (e.g., a database, flat file or other data structure) for storing the signal strengths of the access points and/or client devices on the local network 115.

In one embodiment, an access point 110 includes a roaming module 130a, 130b (also referred to as roaming module 130) that detects client device movement and triggers a determination of whether a client handoff should occur. The determination may be performed by the calculation module 120. In one embedment, the access points 110 are configured to use the same SSID, security passphrase and/or security protocol (e.g., WPA, WPA2, WEP, etc.). The access point can also include a wireless transceiver for transmitting and receiving wireless signals.

The following describes an example embodiment of a method for determining when to transfer clients from one access point to another. The values described are example values which are intended to illustrate but not to limit the disclosure.

In one embodiment, the roaming modules 130 on the access points 110 communicate with each other to get the relative signal strength (RSS) between each access point. The following describes example RSS readings taken in a three access point (AP) local network.

AP 1's Readings:
AP 1 to AP 1=100%
AP 1 to AP 2=50%
AP 1 to AP 3=0%
AP 2's Readings:

AP 2 to AP 2=100%
AP 2 to AP 3=60%
AP 2 to AP 1=50%
AP 3's Readings:
AP 3 to AP 3=100%
AP 3 to AP 2=60%
AP 3 to AP 1=0%

In one embodiment, the roaming manager 105 obtains the AP RSS readings and attempts to build an AP relation table and identify one or more intersect zones that denote overlap between the wireless coverage of different access points.

Figure 7:
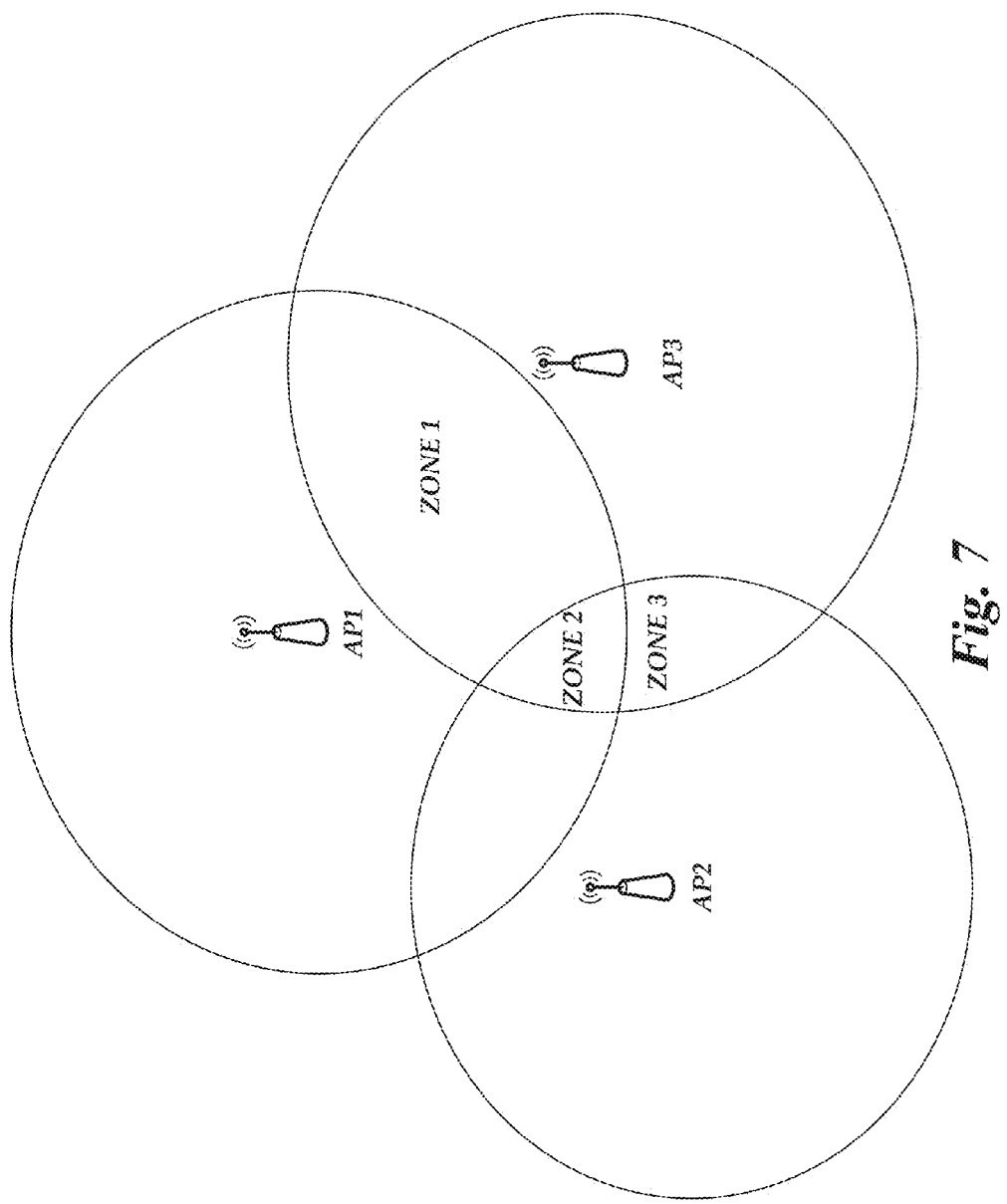
FIG. 7 illustrates a representative network topology diagram associated with an access point (AP) relation table.

In an example, as illustrated in FIG. 7:
Zone 1: AP 1 intersects AP 2
Zone 2: AP 2 intersects AP 3, intersects AP 1
Zone 3: AP 3 intersects AP 2

The roaming manager 105 can use these zones to determine when to check for an access point handoff. For example, a client device in zone 1 is able to connect to both AP 1 and AP 2. When a client device enters the zone 1 intersect zone, the roaming manager 105 can determine whether the client device should connect to AP 1 or AP 2 based at least partly on the RSS of the APs.

In one embodiment, the roaming manager 105 receives a Wireless Client Table list, which includes the RSS data from all the APs, and associates the clients that "intersect" multiple APs into the respective intersect zone for those APs. As clients are added to the local network 115 or are detected to have a change in RSS greater than a particular threshold (e.g., 25%, 30%, 20%, etc.), the roaming module 130 resends data to the roaming manager 105.

In one embodiment, the roaming manager 105 calculates motion and/or trajectory of the client. The following describes one example implementation and scenario where the RSS change threshold is 25%.
1. Within a zone: A client in zone 1 is attached to AP 1 and has a sudden 25% drop in RSS. The new RSS is now below 15%. In some embodiments, a roaming calculation is triggered based on the RSS drop (in this case, 25%) and/or the ending RSS (in this case, 15% being below an RSS threshold). Based on the roaming calculation, the roaming manager 105 requests the roaming module in AP 1 and AP 2 to perform a client transfer.
2. Subsequently, the client device transfers from AP 1 to AP 2. As the client is now connected to AP 2, the roaming manager 105 can obtain the RSS strength of AP 2 at the client device as, typically, client devices are configured to report RSS strength to the connected access point. If the client in zone 1 gets a significantly higher RSS than 15% (AP 1's RSS) with AP 2, then the client is left with AP 2, as it should have a better connection to AP 2.
3. If the client in zone 1 gets an even lower RSS than 15% (AP 1's RSS), then the manager 105 determines that the client is leaving zone 1 coverage. The manager 105 can then determine, based at least partly on the change in RSS and the AP relation table:
   a. If the client is moving into Zone 3 (e.g., RSS for zone 2 drops below 15% in this example implementation, indicating the client is also moving out of zone 2)
   b. Or else, that the client is leaving AP 1's reach and is going away from all zones (e.g., RSS for all zones drop).

The above example illustrates how the roaming manager 105 can calculate client movement and/or trajectory based at least partly on the RSS reported by each AP and the client device. For example, the roaming manager 105 can determine movement from one intersection zone to another intersection zone. Such information can be used by the roaming manager 105 to provide a more seamless experience to the user, for example, by minimizing reconnection lag when the client device transfers from one AP to another. In one example, if the manager 105 determines that the client is moving from AP 1 towards AP 2, the manager 105 can send pre-authentication data, which can include a client identifier (e.g., MAC address) and the client's current IP address, to AP 2 to speed up the connection process and/or provide the same IP address to the client as it moves across APs. In addition, in one embodiment, the manager 105 can duplicate traffic going to the client device to both AP 1 and AP 2 so that the client seamlessly continues receiving data as the client transfers across APs.

In one embodiment, the roaming manager 105, synchronizes the client MAC/IP tables on all APs within the network. As discussed above, this can provide seamless transitions from one AP to another as the client retains the same IP address. With the client information on all APs within the network, it will be pre-authenticated to neighboring zones.

In one embodiment, when the roaming manager 105 determines the client is closer to another AP, the manager instructs the current AP to disconnect the client, which causes the client to automatically initiate searching for available APs and attempt to connect to an AP with the highest RSS.

In one embodiment, the client does not have any additional software or applications other than conventional networking software. As conventional networking software is generally configured to retain connections, the client device will generally stay connected to the same AP even when a stronger AP with a higher RSS is nearby. However, because the roaming manager 105 performs the determination of when to perform an AP handoff and then instructs the current AP to disconnect the client, the manager 105, in effect, forces the client to connect to the stronger AP, superseding the preference of the conventional networking software to remain with the same AP.

Figure 2:
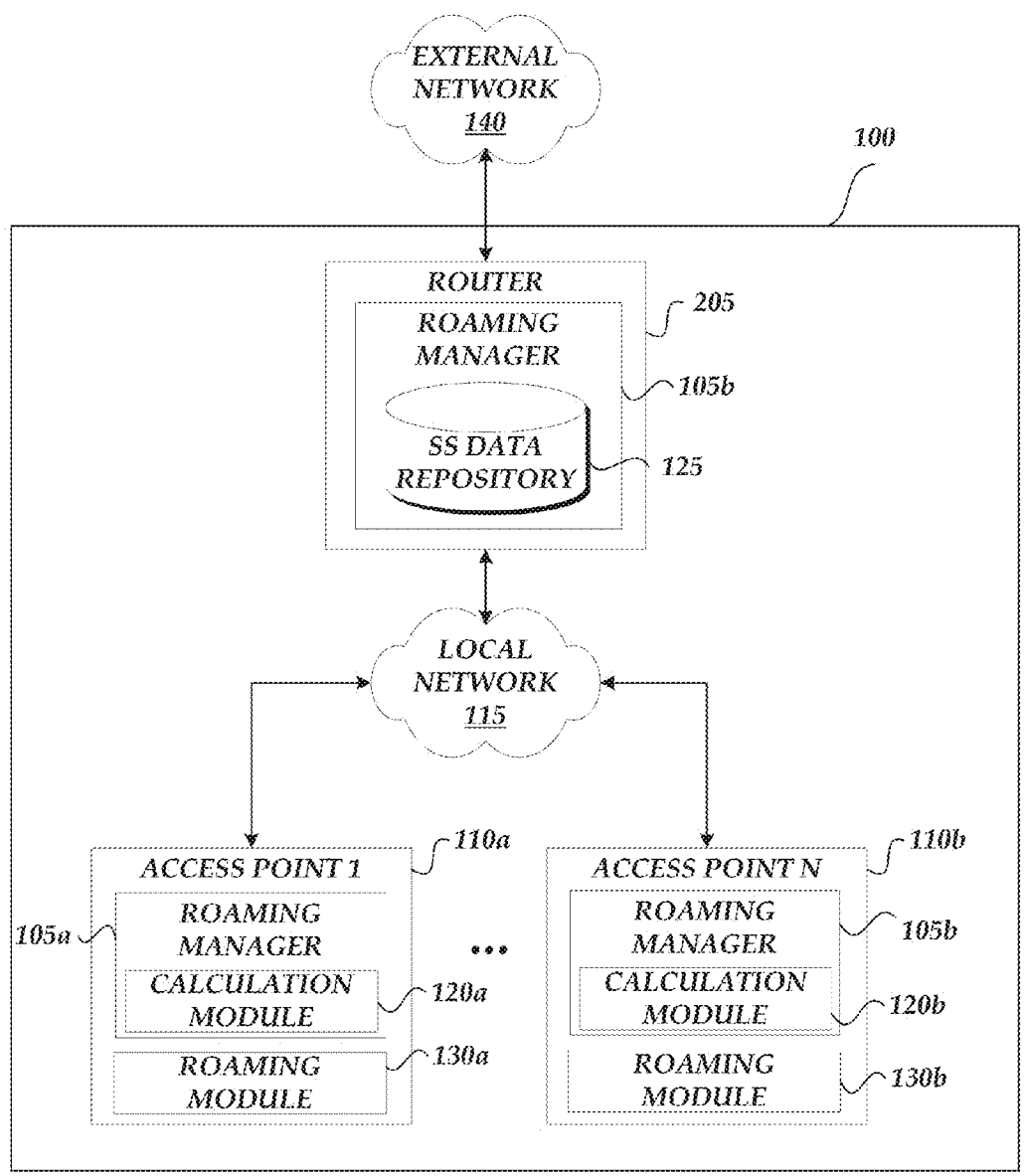
FIG. 2 illustrates a block diagram of another embodiment of the RM system.

FIG. 2 illustrates a block diagram of another embodiment of the RM system 100. FIG. 2 illustrates that, in some embodiments, at least some of the functionality of the roaming manager 105 may be distributed across different networking devices or other computing systems. As show in FIG. 2, instances of the roaming manager 105a-c (or at least some of its functionality) are found in several networking devices. For example, the signal strength data repository 125 may be stored centrally on a router 205 while the calculation module 120a, 120b may be operating on one or more of the access points 110a, 110b. Beneficially, distributing the calculations can allow functions of the RM system 100 to be performed by lower-capability processors on the networking devices, as each individual processor may only need to perform part of the calculations performed by the RM system 100 as a whole.

Figure 3:
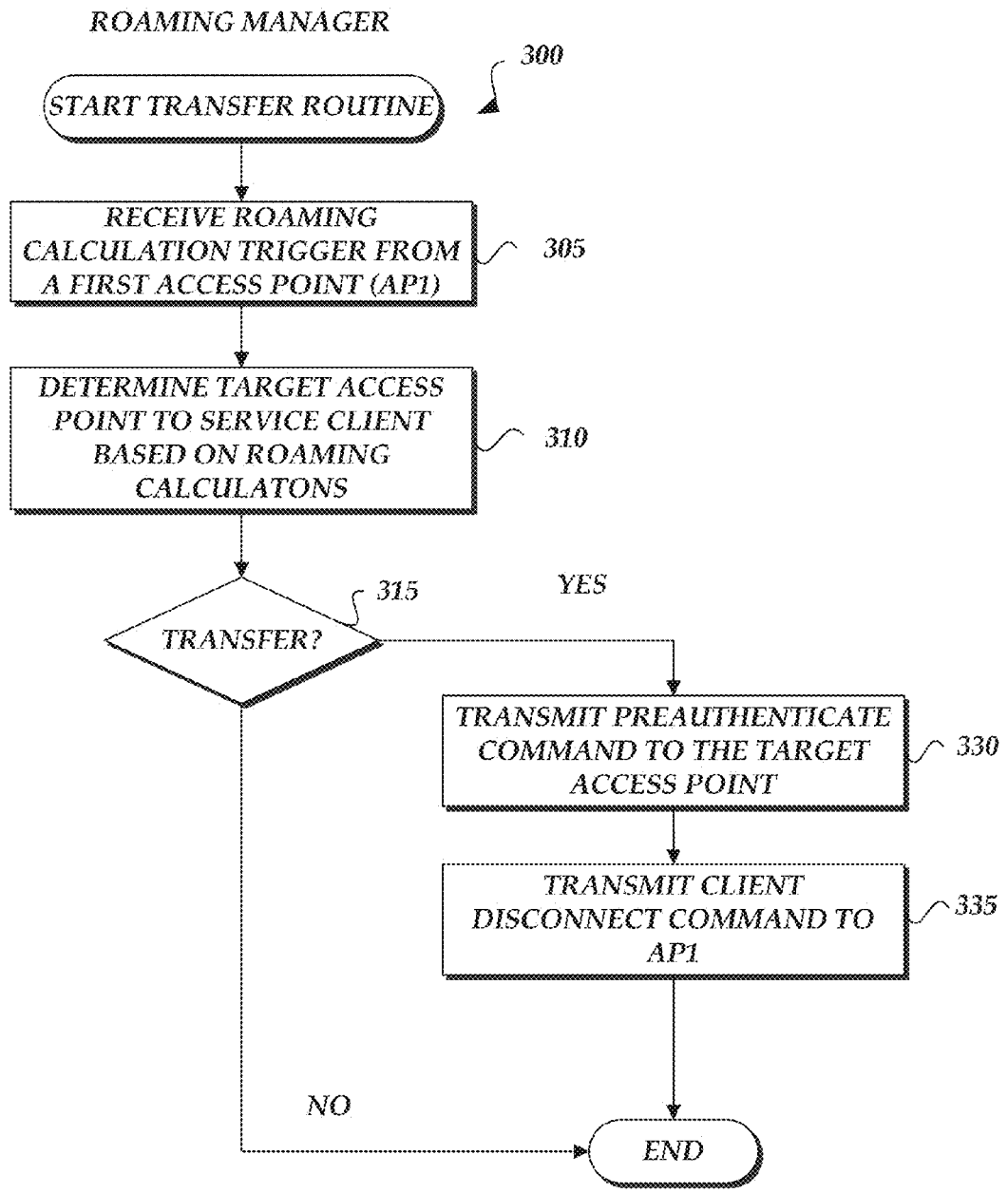
FIG. 3 illustrates a flow chart of an embodiment of a client transfer routine for a roaming manager of the RM system.

FIG. 3 illustrates a flow chart of an embodiment of a transfer routine 300 for transferring a client device to a different access point. In some implementations, the routine 300 is performed by embodiments of the roaming management system 100 described with reference to FIG. 1 or by one of its components, such as the roaming manager 105. For ease of explanation, the following describes the routine 300 as performed by the roaming manager 105. The routine is discussed in the context of an example scenario that is intended to illustrate, but not to limit, various aspects of the RM system 100.

Beginning at block 305, the roaming manager 105 receives a roaming calculation trigger from a first (or "source") access point (AP 1). For example, AP 1 may detect that a client device connected to it now has a weak AP 1 signal and is in an intersect zone where a second AP is available. In some cases, the client device is configured to report the RSS of the signal it is receiving from AP 1, which allows AP 1 to determine that the client device has a weak AP 1 signal.

At block 310, the manager 105 determines a target AP to service the client based at least partly on roaming calculations. As discussed above, in one embodiment, the manager 105 obtains RSS data from the access points. Using the RSS data, the manager 105 can estimate which AP should have the strongest signal strength at the client by comparing the relative signal strengths of the APs. In some cases, the client device may stay with the current AP to which it is connected (e.g., if the RSS of the current AP is above a certain threshold or is stronger than other available APs), while in some cases, the client device may be transferred (e.g., another AP has a higher RSS).

At block 315, the roaming manager 105 determines whether to transfer the client device. In one embodiment, the manager 105 transfers the device if it determines that the RSS for the current AP has dropped past a certain threshold (e.g., a 25% drop in signal strength). If the manager 105 decides to transfer the client device, the routine proceeds to block 330. If the manager 105 decides to not to transfer the client device, the routine 300 ends, thought the routine may be performed again when another roaming calculation is triggered (e.g., if the client device moves or the signal strength otherwise changes).

Optionally, at block 330, the roaming manager 105 transmits a pre-authenticate command to the target AP for the client device. In one embodiment, the command includes the client device's assigned IP address from when it was connected to AP 1. Additional data may also be transmitted, such as the client device's MAC address and/or a security token.

In one embodiment, the target AP is configured to provide the same IP address to the client device that was previously assigned to it, thereby allowing the client device to be handed off transparently to applications operating on the client device. For example, if the user is streaming video or browsing the Internet, packets that were addressed to its original IP address will still reach the client device because it retained its IP address even after it switches to a different AP. Thus, the user can continue using the device with minimal interruption to current tasks being performed on the client device.

In one embodiment, the target AP is configured to skip normal authentication procedures (e.g., WPA handshakes or the like) if the client device is pre-authenticated. This can provide a more transparent handoff process since the time taken by the client device to connect to the target AP is minimized or at least reduced.

At block 335, the roaming manager 105 transmits a client disconnect command to AP 1. This causes AP 1 to disconnect the client device. The client device then searches for another access point to connect to. Presumably, the target AP has the highest signal strength at the client device's location, thus, the client device should connect to the target AP. As discussed above, in one embodiment, the client device includes conventional networking software that is typically configured to connect to the strongest signal for an SSID detected at the client device. While the above has described block 330 as preceding block 335, in some embodiments, block 335 can be performed before or substantially concurrently with block 330.

Figure 4:
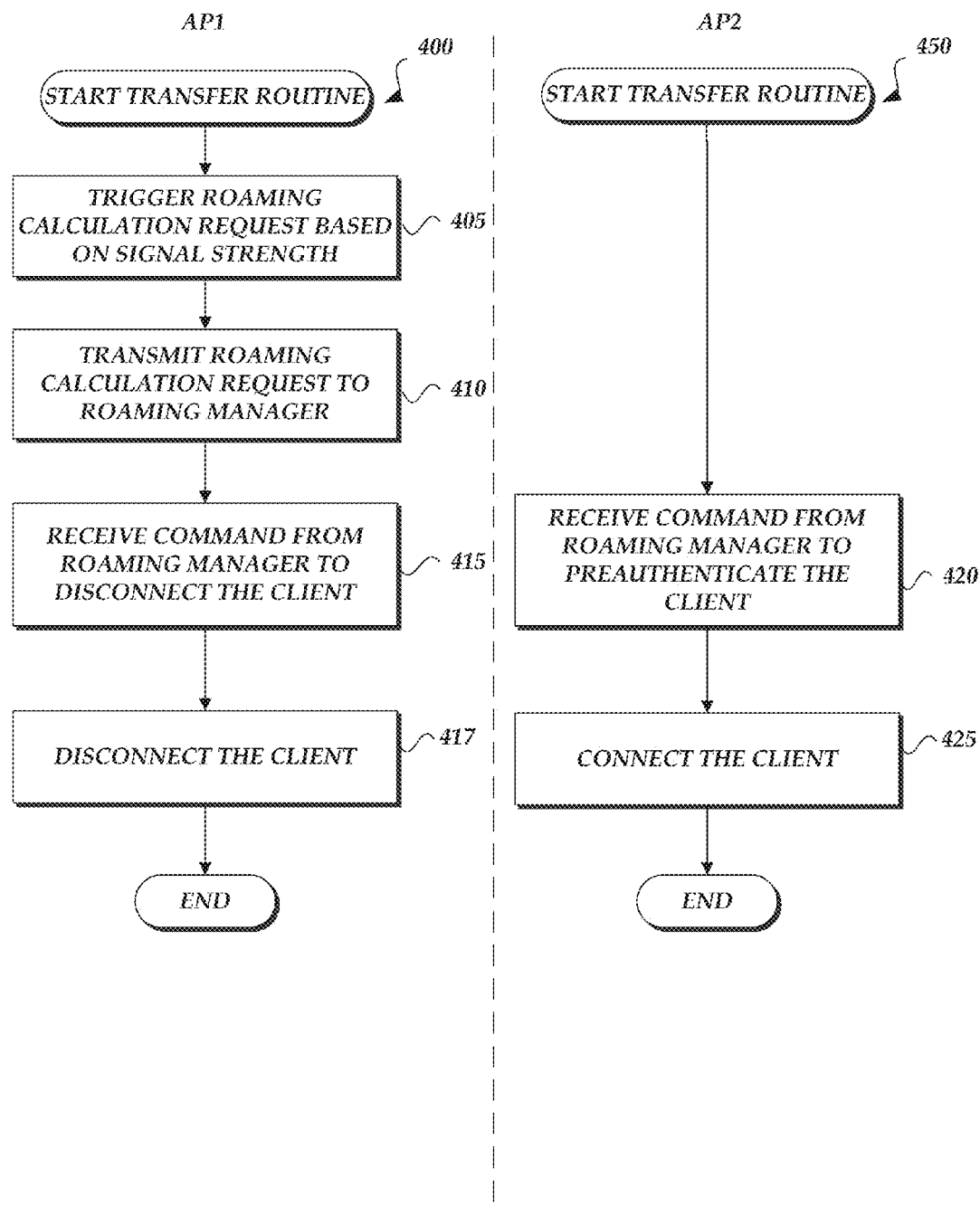
FIG. 4 illustrates a flow chart of embodiments of client transfer routines for access points of the RM system.

FIG. 4 illustrates a flow chart of embodiments of transfer routines 400, 450 for transferring a client device from a source access point (e.g., AP 1) to a target access point (e.g., AP 2). In some implementations, the routines 400, 450 are performed by embodiments of the roaming management system 100 described with reference to FIG. 1 or by one of its components, such as the roaming modules 130 operating on the access points. For ease of explanation, the following describes the routines 400, 450 as performed by roaming modules on two access points (AP 1 and AP 2). The routine is discussed in the context of an example scenario that is intended to illustrate, but not to limit, various aspects of the RM system 100.

Beginning at block 405, AP 1 triggers a roaming calculation request based at least partly on the detected signal strength(s). For example, the AP 1 can determine the signal strength that it detects from the client device and AP 1's signal strength that is reported by the client device. In one embodiment, if the reported AP 1 RSS drops by a certain threshold (e.g., 25% or more), AP 1 sends a roaming calculation request to the roaming manager 105 (block 410). The roaming calculation request can be sent with various signal strength data to enable the calculation to be performed, such as the signal strengths of other APs detected by AP 1, the signal strength for AP 1 as reported by the client device and/or the signal strength of the client device as detected by AP 1. In some embodiments, the signal strength data is sent separately from the request. For example, the roaming manager 105 may be configured to perform a signal strength monitoring process by querying respective APs on the LAN for the signal strength data. AP 1 may also send identifying information for the client device, such as the current IP address of the device and its MAC address.

At block 415, assuming the roaming manager 105 decides to transfer the client device, AP 1 receives a command from the roaming manager to disconnect the client device and disconnects the device. Subsequently, at block 417, AP 1 disconnects the client device. The routine 400 can then end.

Meanwhile AP 2 is performing routine 450 at least partially concurrently with routine 400. At block 420, AP 2 receives a command from the roaming manager to pre-authenticate the client device. AP 2 then prepares to receive a connection request from the client device. For example, AP 2 may be prepared to assign the same IP address to the client device that it previously had when connected to AP 1. Depending on the implementation, block 415 may be performed concurrently with block 420, block 415 may be performed first, or block 420 may be performed first. At block 425, AP 2 receives a connection request from the client device and connects the client to the network. Preferably, block 425 occurs soon after block 417, thereby minimizing the reconnection time for the client device. The routine 450 can then end.

Figures 5A, 5B:
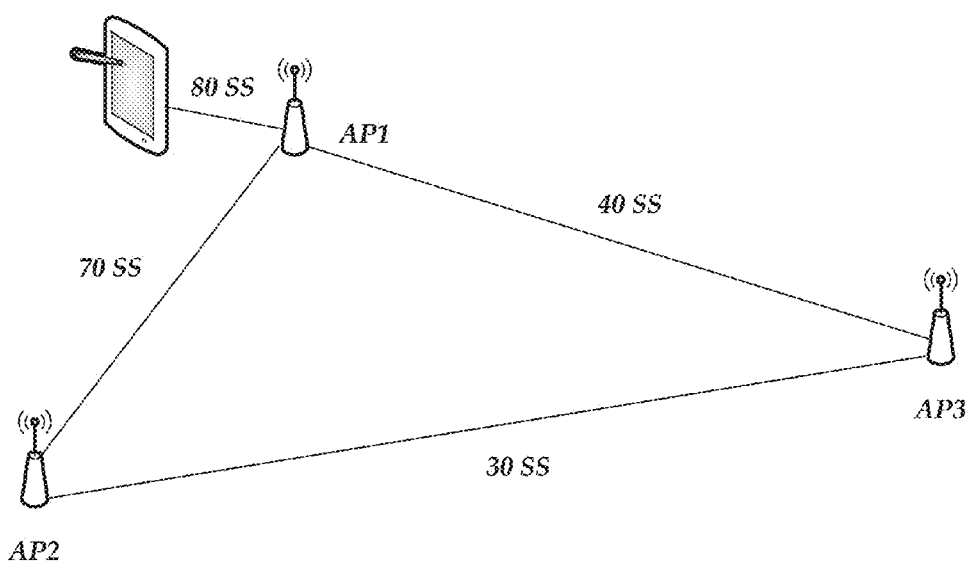
FIG. 5A illustrates an embodiment of a data structure for storing signal strength data monitored by the RM system.
FIG. 5B schematically illustrates a network diagram of an example local area network (LAN) that corresponds to the signal strength data of FIG. 5A.

FIG. 5A illustrates an embodiment of a data structure for storing signal strength data monitored by the RM system. In one embodiment, the system 100 monitors the RSS of each reachable AP from each receiving AP. For example, for AP 1, the system 100 monitors the RSS of AP 2 and AP 3 as detected from AP 1. The system 100 can also monitor the client's reported RSS for access points reachable from its location. For example, the client may report that AP 1 has an RSS of 80 from its current location, and the data is then stored by the RM system 100. The RM system can use the collected signal strength data in its calculations of when to trigger handoffs and/or in determining where intersect zones are located. FIG. 5B schematically illustrates a network diagram of an example local area network that corresponds to the signal strength data of FIG. 5A.

Figure 6A:
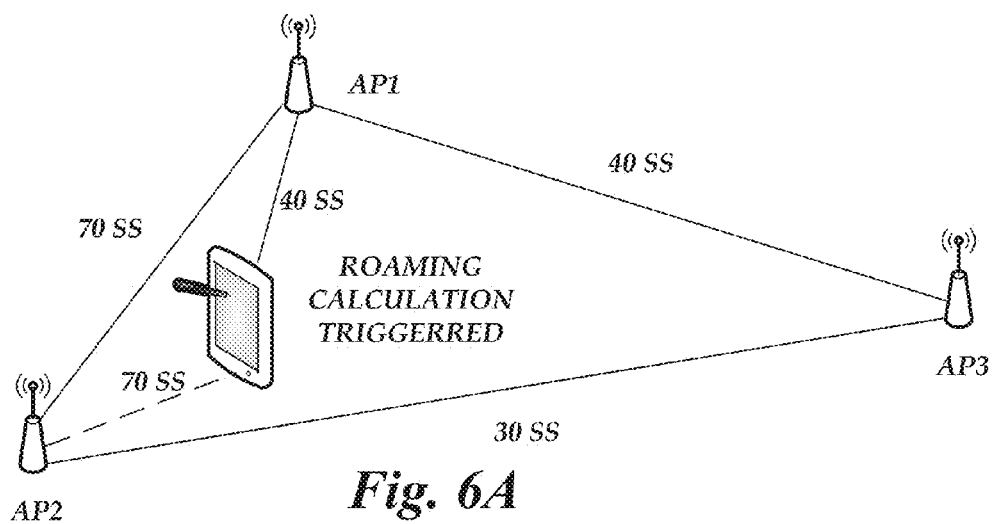
FIGS. 6A-B schematically illustrates a network diagram showing an access point transfer from a first access point to a second access point.
Figure 6B:
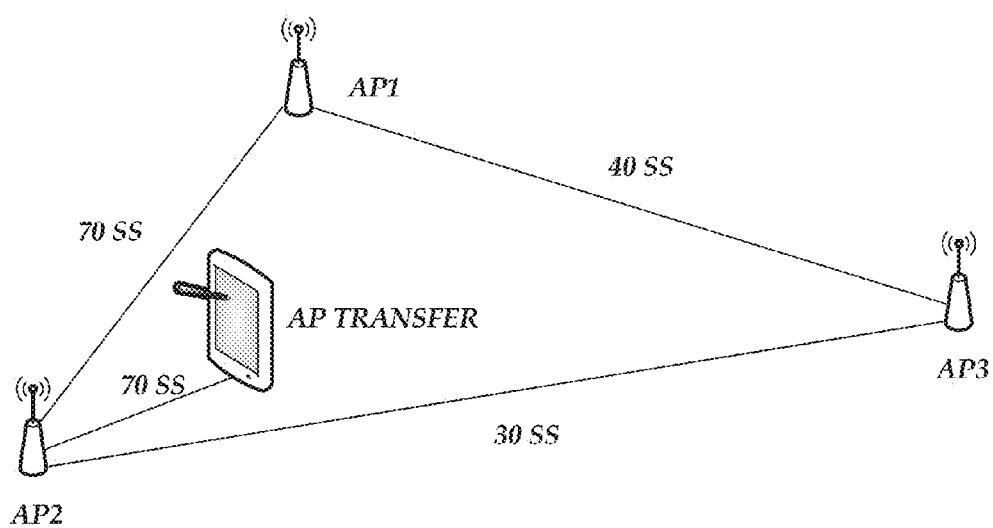

FIGS. 6A-B schematically illustrates a network diagram showing an access point transfer from a first access point to a second access point. In FIG. 6A, the client device is still connected to AP 1, but has moved close enough to AP 2 that AP 2's signal strength is now greater. In FIG. 6B, the RM system 100 determines that the client device should be transferred to AP 2 and forces the client to connect to AP 2. For example, the system 100 can cause AP 1 to disconnect the client device, which causes the client device to connect to the AP with the strongest signal strength, AP 2.

FIG. 7 illustrates a representative network topology diagram associated with an AP relation table, as discussed in an example above. In FIG. 7, AP 1, AP 2 and AP 3 have overlapping wireless coverage. For example, AP 1 and AP 2 overlap in Zone 1. AP 1, AP 2 and AP 3 overlap in Zone 2. AP 2 and AP 3 overlap in Zone 3.

Many implementation variations are possible. For example, while the above examples have discussed two and three AP configurations, any number of AP points may be used with the RM system 100. In another example, the RM system may perform triangulation of the client device to determine a physical location (e.g., when 3 or more APs are within range of the client device), rather than (or in addition to) relying on relative signal strengths. In addition, while the above description has included examples of operations performed with respect to "all" the APs, in some embodiments, those operations may be performed on only a subset of the APs.

In another example variation, while the above has generally described actions being triggered based on percentage changes in the relative signal strengths, actions may also be triggered based on comparisons of signal strengths to certain thresholds. For example, if signal strengths are measured in decibel-milliwatts (dBm), then a measurement of 30-40 dBm may trigger a roaming calculation, while a measurement of 80 dBm may indicate a good connection.

In some embodiments, the above system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the above system and its components are executed or embodied by one or more physical or virtual computing systems. For example, in some embodiments, a computing system, such as a server or networking device, that has components including a central processing unit (CPU), input/output (I/O) components, storage and memory may be used to execute some or all of the components of the above system. The I/O components can include a display, a network connection to the network, a computer-readable media drive and other I/O devices (e.g., a keyboard, a mouse, a touch screen, speakers, etc.).

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A wireless roaming management system, the system comprising:
   memory configured to store relative signal strength data for a plurality of access points operating on a local area network, the relative signal strength data comprising a signal strength datum from each one of the plurality of access points to each other one of the plurality of access points; and
   one or more processors configured to:
      receive a request for a roaming calculation for a client device from a source access point of the plurality of access points with which a signal strength from the client device has dropped below a predetermined threshold and triggered a roaming calculation request, wherein the client device comprises conventional networking software and the client device is distinct from the wireless roaming management system;
      perform the roaming calculation;
      determine a target access point from the plurality of access points to service the client device based at least partly on the stored relative signal strength data and the roaming calculation, wherein determining the target access point comprises:
         determining a first intersect zone of a first set of access points in which the client device is located;

determining a trajectory of the client device from the first intersect zone into a second intersect zone of a second set of access points based at least partly on changes to the relative signal strengths of the first set of access points; and selecting the target access point from the second set of access points based at least partly on the trajectory;

cause the client device to be disconnected from the source access point and connected to the target access point, thereby superseding preferences of the conventional networking software on the client device; and transmit a pre-authentication for the client device to the target access point, the pre-authentication identifying the client device to the target access point and causing the target access point to skip one or more authentication procedures.

2. The system of claim 1, wherein causing the client device to be disconnected comprises transmitting a client disconnect command to the source access point.

3. The system of claim 1, wherein the client device is configured to auto-initiate a connection to an access point having the strongest signal strength.

4. The system of claim 1, wherein determining the target access point further comprises:

comparing relative signal strengths of the second set of access points; and selecting the target access point, from the second set of access points, deemed to have the strongest signal strength at the client device.

5. The system of claim 1, wherein the one or more processors are further configured to collect local signal strength data from each of the plurality of access points located on the local area network, the local signal strength data comprising signal strength data for one or more other access points as observed at a respective access point.

6. A method for managing wireless roaming on a local network wireless system, the method comprising:

storing relative signal strength data for a plurality of access points operating on a local area network, the relative signal strength data comprising a signal strength datum from each one of the plurality of access points to each other one of the plurality of access points;

receiving a request for a roaming calculation for a client device from a first access point of the plurality of access points with which a signal strength from the client device has dropped below a predetermined threshold and triggered a roaming calculation request, wherein the client device comprises conventional networking software and the client device is distinct from the local network wireless system;

performing the roaming calculation;

determining a second access point from the plurality of access points to service the client device based at least partly on the stored relative signal strength data and the roaming calculation, wherein determining the second access point comprises:

determining a first intersect zone of a first set of access points in which the client device is located;

determining a trajectory of the client device from the first intersect zone into a second intersect zone of a second set of access points based at least partly on changes to the relative signal strengths of the first set of access points; and selecting the second access point from the second set of access points based at least partly on the trajectory;

causing the client device to be disconnected from the first access point and connected to the second access point, thereby superseding preferences of the conventional networking software on the client device; and transmitting a pre-authentication for the client device to the second access point, the pre-authentication identifying the client device to the second access point and causing the second access point to skip one or more authentication procedures.

7. The method of claim 6, wherein causing the client device to be disconnected comprises transmitting a client disconnect command to the first access point.

8. The method of claim 6, wherein the client device is configured to auto-initiate a connection to an access point having the strongest signal strength.

9. The method of claim 6, wherein determining the second access point comprises:

comparing relative signal strengths of the second set of access points; and selecting the target access point, from the second set of access points, deemed to have the strongest signal strength at the client device.

10. The method of claim 6, further comprising collecting local signal strength data from each of the plurality of access points located on the local area network, the local signal strength data comprising signal strength data for one or more other access points as observed at a respective access point.

* * * * *